(12) United States Patent
Rosa

(10) Patent No.: US 12,339,640 B2
(45) Date of Patent: Jun. 24, 2025

(54) SUPERVISORY SYSTEM FOR MONITORING VARIABLES OF A PROCESS PLANT

(71) Applicant: PETRÓLEO BRASILEIRO S.A.—PETROBRAS, Rio de Janeiro (BR)

(72) Inventor: Daniel Cabral Rosa, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 450 days.

(21) Appl. No.: 17/355,455

(22) Filed: Jun. 23, 2021

(65) Prior Publication Data

US 2022/0026873 A1 Jan. 27, 2022

(30) Foreign Application Priority Data

Jun. 24, 2020 (BR) .......................... 1020200129449

(51) Int. Cl.
G05B 23/02 (2006.01)
G05B 19/406 (2006.01)
G06F 3/0481 (2022.01)

(52) U.S. Cl.
CPC ....... G05B 19/406 (2013.01); G05B 23/0272 (2013.01); G06F 3/0481 (2013.01); G05B 2219/32403 (2013.01)

(58) Field of Classification Search
CPC ........ G05B 19/406; G05B 2219/32403; G05B 23/0272; G06F 3/0481
See application file for complete search history.

(56) References Cited

U.S. PATENT DOCUMENTS

| | | | |
|---|---|---|---|
| 6,219,046 B1* | 4/2001 | Thomas | G05B 23/0272 715/965 |
| 6,377,283 B1* | 4/2002 | Thomas | H02J 13/00001 715/810 |
| 2004/0064397 A1* | 4/2004 | Lynn | G06Q 40/04 705/37 |
| 2004/0263424 A1* | 12/2004 | Okuley | G06F 3/1446 345/1.1 |
| 2018/0143961 A1* | 5/2018 | Thomas | H04L 67/10 |

* cited by examiner

*Primary Examiner* — Haoshian Shih
(74) *Attorney, Agent, or Firm* — Birch, Stewart, Kolasch & Birch, LLP

(57) ABSTRACT

The present invention refers to an ECOSCEL supervisory system with application in the E&P area, particularly in the control rooms of offshore production platforms, or in onshore plants, aiming to allow a summary of the process in only two screens, in which all the most important variables used are concentrated. The flexibility of inserting important variables and notifications allows, at any time, a rapid update of the operational demands of the control room administrators. With the visual organization of the ECOSCEL supervisor, the operator of control room can immediately perceive a variable outside the range, in time to intervene with appropriate control actions to prevent (shutdown) of a piece of equipment, system or process.

6 Claims, 4 Drawing Sheets

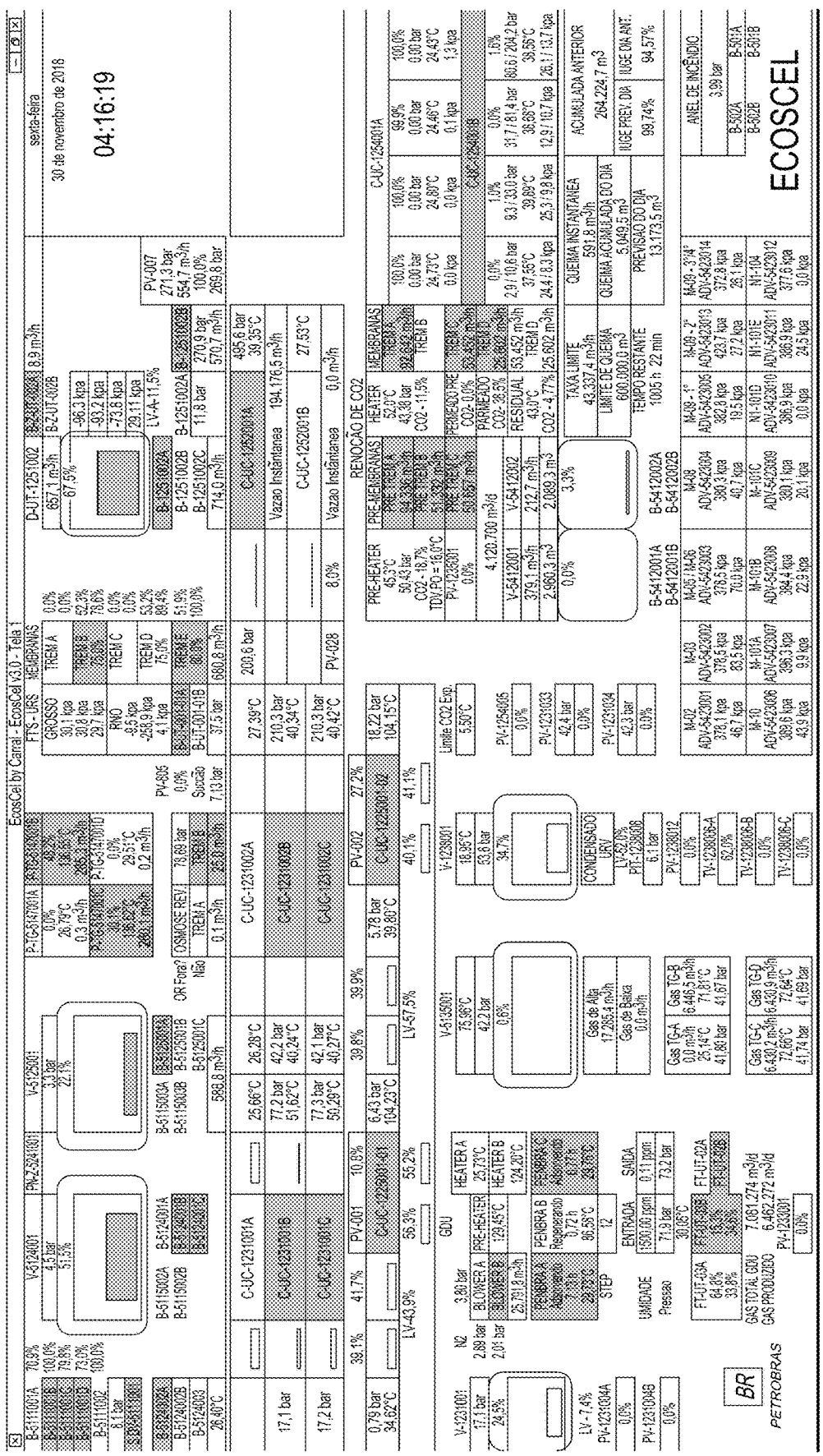
Figure 1.1

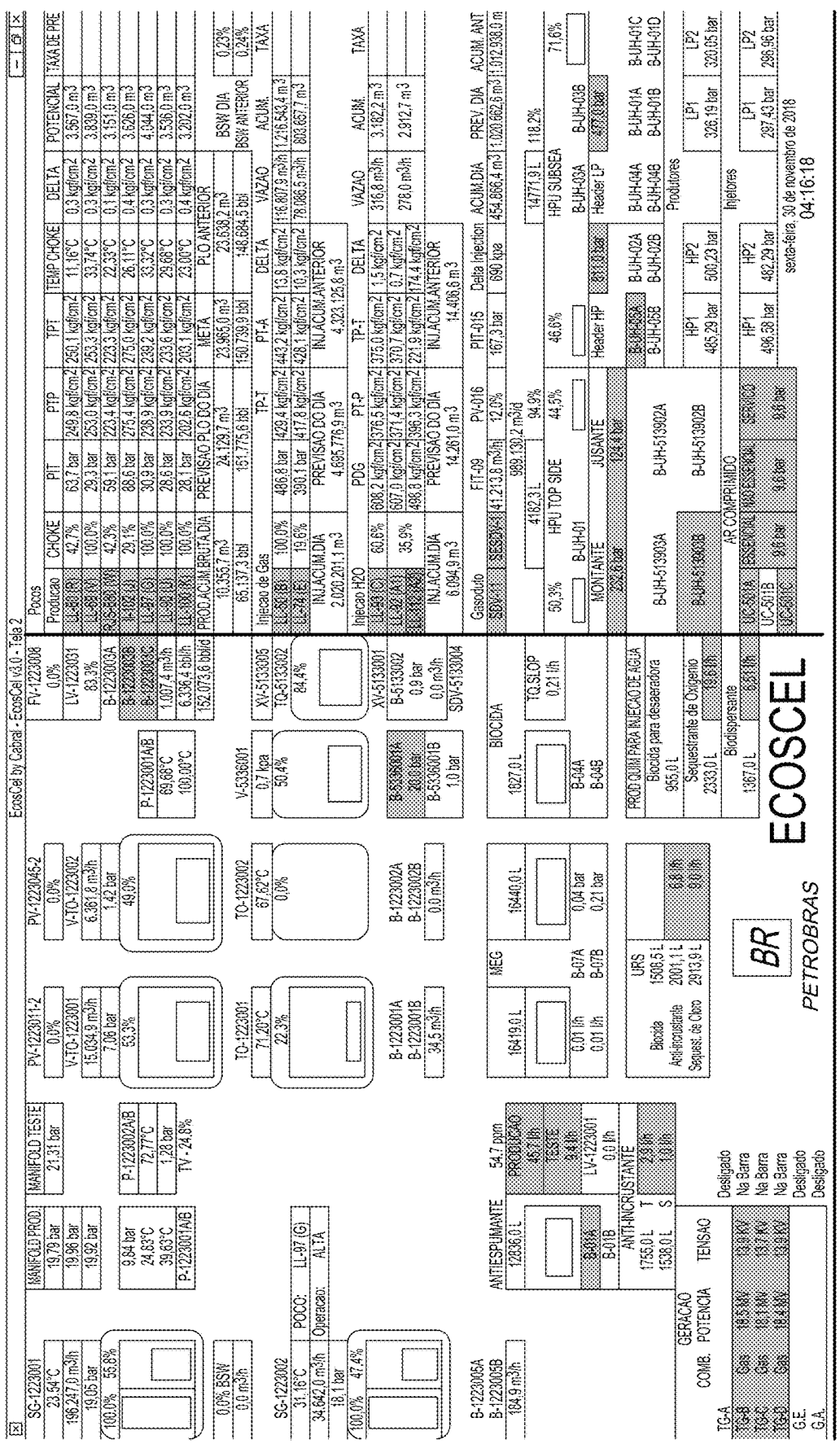
Figure 1.2

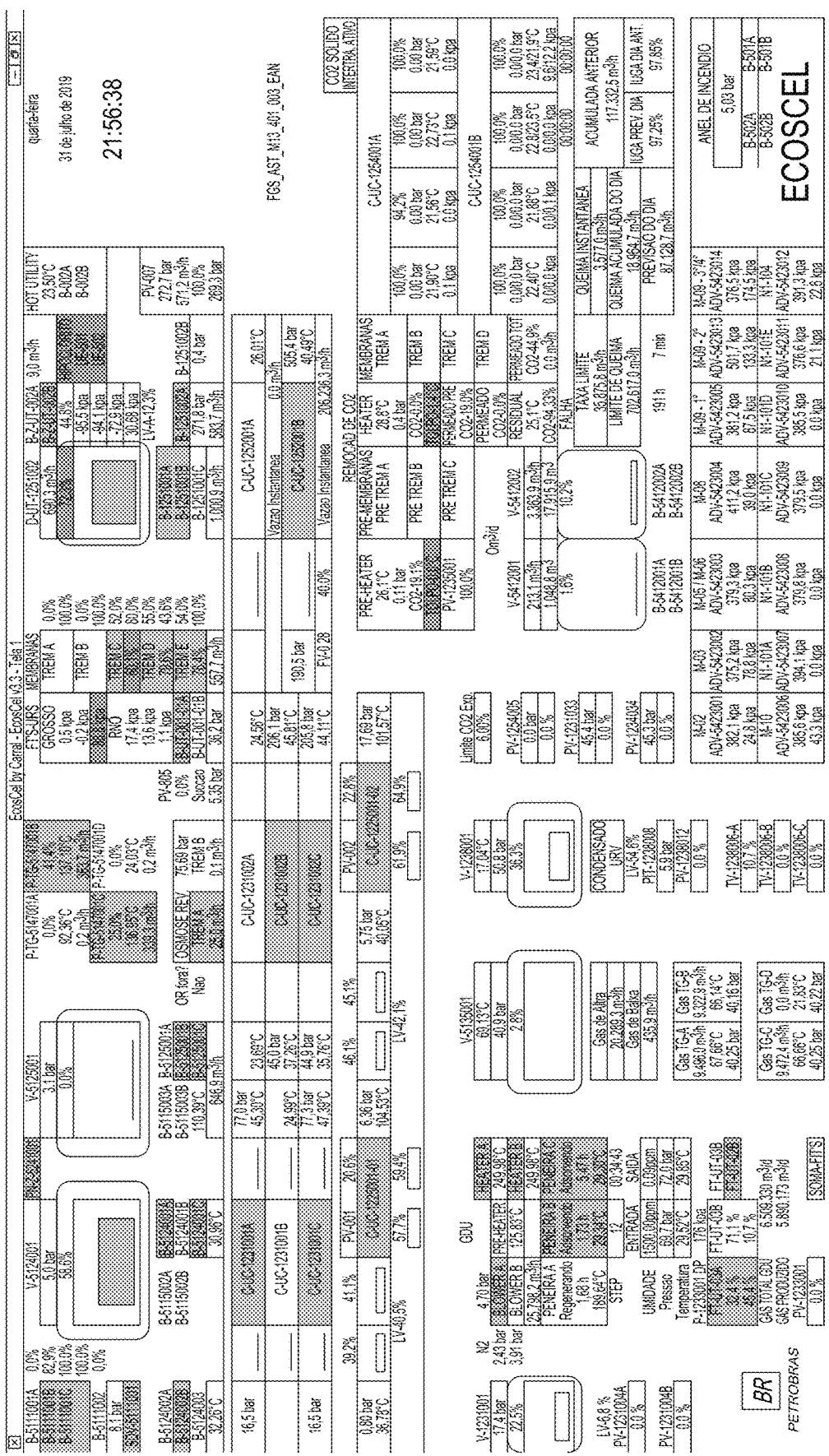
Figure 2.1

Figure 2.2

SUPERVISORY SYSTEM FOR MONITORING VARIABLES OF A PROCESS PLANT

FIELD OF INVENTION

The present invention refers to an ECOSCEL supervisory system with application in the E&P area, particularly in control rooms of offshore production platforms, or in onshore plants. ECOSCEL Supervisory allows a summary of the process of monitoring and supervising of the variables and devices of the Process Plants control systems in only two screens, in which all the most important variables used are concentrated. The flexibility to insert important variables and notifications, made possible by the ECOSCEL supervisory system, allows, at any time, a rapid update of the operational demands of the Control Room administrators. With the visual organization of the ECOSCEL supervisor, the operator of control room can immediately perceive a variable outside the range, in time to intervene with appropriate control actions to prevent shutdown of a piece of equipment, system or process.

DESCRIPTION OF THE STATE OF THE ART

The operation of the central control room of FPSO P-66 (Pioneer in Pre-Salt Production) is carried out through the SOS (Operation and Supervision System), in which the operator has several variables of all systems and subsystems in the Process Plant. The complexity of the Pre-Salt production systems is quite high, and controlling all variables is a task that mainly requires the organization of information (selected variables, colors, size, order, etc.) for the rapid identification of a deviation and, consequently, decision making.

Currently, the SOS has a total above than 100 screens for monitoring, requiring the existence of summary screens of macroprocess (Production-Oil, Production-Gas, Compressors, VAC, Electrical. Facilities and Safety) with the most important variables for the operator. The problem consists of the Supervisory interface with the operator, both in the regular screens and in the summary screens, where instruments and equipment in stand-by or maintenance (without direct interference in the process) remain permanently "actuated". This fact is common to all systems and subsystems and causes pollution of the screens with irrelevant events, making it difficult for operators to immediately identify deviations; that is, the actual deviations are mixed on the same screen with events already known and that do not interfere with the process. Another problem is the availability of information from the process interlocking instruments (which result in shutdown of a piece of equipment or system—shutdown), which are hidden when the system has another instrument with the control function and does not have a pre-alarm, which further hinders the rapid action to prevent a shutdown and, consequently, the loss of production.

Even if the control operator is always "paging" the control screens, there is no time to predict or anticipate an occurrence or lack of control of the process. Thus, when the alarm in the Supervisory has been issued, the lack of control and its consequences will have already occurred. After the alarm, the amount of subsequent alarms prevent a quick and clear visualization of the causative event and its implications.

Document CN107942871 discloses a data acquisition system performed by the MOX equipment comprising the following six parts: fan motor control equipment for dust removal, MOX equipment, communication software, database, industrial automation configuration software, and display terminal. The communication interface 485 on the motor control device of the dust removal fan is connected to the MOX device, and the MOX device is connected to the communication software of secondary system via Ethernet communication. The communication software is connected to the database, and the MOX device can be transmitted to the communication software. The parameters in it are saved in the database.

In addition, document CN107942871 discloses that the database is connected to the industrial automation configuration software. Industrial automation configuration software is Intouch software. The visualization terminal can extract the database parameters from the visualization terminal via industrial automation configuration software and display the visualization terminal into the desktop of the computers. However, such document does not disclose an integration of Supervisory with Excel as shown by this invention.

Document US20130066568 discloses integrating mass balance, acoustical, and artificial neural networks technologies for detecting, locating, and quantifying leaks or holes in pipelines. The invention provides an accurate location of leak and quantifies the leaked product from the gas pipeline. The information of the two modules is crossed before making decisions and issuing an alarm to the user. The combination of mass balance, artificial neural network (RNA), and acoustic technologies offers a significant gain in system reliability, substantially reducing the number of false alarm occurrences.

More specifically, document US20130066568 discloses the use of the driver for communication with generic interface (HMI) (Intouch and iFIX), via OPC. However, such document does not disclose an integration of Intouch Supervisory with Excel as presented by present invention.

The document MARTINS, F. K. "Estudo sobre características de diferentes softwares de supervisão em automação. Monografia, Universidade Tecnológica Federal do Paraná, Curitiba, 2011" discloses a study about industrial supervision systems, demonstrating some characteristics of software that are available in the market, and two applications where this type of technology was used. Initially, the work shows a theoretical foundation on SCADA (Supervisory Control and Data Acquisition) system, supervisory software, and the components thereof. Then characteristics of supervisory software from six different manufacturers are presented: Elispse, Intouch, Process View, Simatic WinCC, Ifix, Wizcon. Finally, two applications are described where the supervisory softwares were used. However, the document also does not disclose an integration of Supervisory with Excel as shown in this invention.

The document MACHADO, C. F. B, PONTES, M. O. "SCADA—Abordagem detalhada e comparação entre softwares de supervisão para aplicação em projetos de automação, Instituto Federal de Educação, Ciência e Tecnologia Fluminense, Campos dos Goytacazes, Maio, 2013" discloses that remote control and supervision are indispensable resources for centralization of control information of an industrial process. The centralization of control and production information can generate increased productivity, reliability, safety, and final quality. The Data Acquisition and Control Supervision (SCADA) system is one of the technological tools that allow remote control and supervision. The SCADA system is frequently found in various industrial and non-industrial processes. Given this context, this work begins with the presentation of the main technologies used in the implementation of SCADA systems and some architectures thereof, citing the presentation of the main existing resources in supervisory software, for the implementation of an Interface Human-Machine (HMI) and ends with the comparative analysis between two supervisory softwares. The paper further shows practical aspects that can be used for projects developed by automation professionals. As in other cases, the document also does not reveal an integration of Supervisory with Excel as shown in present invention.

No prior art document discloses a supervisory system with a simple visual organization, on only two screens, where all the most important variables and used in a Process Plant are concentrated, allowing rapid decision-making based on this information such as that of the present invention.

In addition, the present invention reduces unscheduled shutdowns and the impacts thereof, further, to assisting in decisions to meet the goals of the unit's oil and gas production, using a lightweight, easy-to-understand interface.

BRIEF DESCRIPTION OF THE INVENTION

The present invention refers to an ECOSCEL supervisory system with application in the E&P area, particularly in the control rooms of offshore production platforms, or in onshore plants. The ECOSCEL Supervisor allows a summary of the process of monitoring and supervision of the variables and devices of the control systems in only two screens, in which all the most important variables used in the process are concentrated. The flexibility to insert important variables and warnings, made possible by the ECOSCEL supervisory system, allows, at any time, a rapid update of the operational demands of the Control Room administrators.

With the visual organization of the ECOSCEL supervisor, the operator of control room can immediately perceive a variable outside the range, in time to intervene with appropriate control actions to prevent (shutdown) of a piece of equipment, system or process. That is, with the interaction of Intouch with Excel, the data is acquired in Excel in real time, without interruptions.

BRIEF DESCRIPTION OF DRAWINGS

The present invention will be described in more detail hereinafter with reference to the accompanying drawings which, in a schematic and non-limiting manner of the inventive scope, represent exemplary embodiments hereof. In the drawings, we have:

FIGS. 1.1 and 1.2 illustrating the visual organization of the ECOSCEL supervisor on only 2 screens, with a broad view of a Process Plant and its most important variables;

FIGS. 2.1 and 2.2 illustrating an example of the ECOSCEL supervisor on only 2 screens, allowing to see, quickly and clearly, the interactions between the systems of a Process Plant.

DETAILED DESCRIPTION OF THE INVENTION

The ECOSCEL Supervisory, object of this invention, consists of a system for monitoring and supervising the variables and devices of the control systems of Process Plants, summarized in only two screens, which concentrate all the most important variables then used. The flexibility of inserting important variables and notifications at any time allows a quick update of the operational demands of the Control Room administrators. In the adopted configuration, the screens have white background, cells with green and red colors (equipment operating or stopped), characters with black or red colors (values inside or outside the expected), as well as an animation with the levels of vessels and scrubbers.

In the Official Supervisor (SOS), which is loaded directly from the Intouch software, the bottom of the screens is gray, and the equipment and pipelines have a color for each type of fluid. In the case of valves, pumps, and compressors, when in the open or on position, remain with the same color as the pipelines. When in the closed or off position, they remain gray, same color as the screen background. The levels of vessels have as graphical representation only an arrow that displaces in a "bar graphic". These aspects make it difficult rapid visualization and response by operators.

In the ECOSCEL supervisory program, Excel program is used, and the data collection is performed instantly by Intouch. Excel uses the DDE protocol to receive information from Intouch. With Intouch and Excel open, to establish this connection, the following code is inserted into a cell: =view|tagname!'ACCESSNAME:TAGNAME', where "view" is the name of Intouch executable, "tagname" is the name of the Intouch tag "library", "ACCESSNAME" is the name registered in Intouch to access servers (each has a specific name) and finally "TAGNAME" is the name of tag registered in Intouch, such as for example: =view|tagname'PCS:PCS_PIT_1223011_EAN', this returns the value of PIT-1223011 that is linked to the control server (PCS). The value obtained in Excel cell comes in text format, which is converted into numeric format. The color change of one of the parameters draws the attention of the operator, who has time to act before there is an occurrence or automatic actuation of the interlocking and control system. This also allows the instant visualization of which systems are operating and which are out of operation.

The automation system of the Process Plant has safety and control instruments, which would be "redundant". However, despite being designated to measure the same variable, the pre-alarms are linked only to the control instrument, and the safety instruments are linked only to "Trip". When there is a discrepancy between the measured values, "Trip" may occur before the pre-alarm. In addition, there may be specific measuring points where there is only the safety instrument.

In the ECOSCEL supervisory system, priority was given to safety instruments and pre-alarms were implemented therein, in addition to a discrepancy alarm being implemented, to be triggered when the values of the control and safety instruments show a difference that may cause some disturbance to the process.

With the visual organization of the ECOSCEL supervisor, the control room operator can immediately perceive a variable outside the range, in time to intervene with appropriate control actions to prevent shutdown of equipment, system or process, as can be seen in the examples below. The wide view of the Process Plant on only 2 screens allows you to observe the interactions quickly and clearly between the systems.

EXAMPLE 1: URV

Due to the flow difficulty of condensate, the level of scrubbers and SAO's (Water and Oil Separators) must be constantly monitored. After the implementation of ECOSCEL supervisory several falls of this system were avoided.

EXAMPLE 2: TOPSIDE AND SUBSEA HPU

Some ESD-2 were avoided due to failure in the start the pumps that should maintain the pressure of the HPU's with monitoring by the ECOSCEL supervisor.

EXAMPLE 3: WELLS

Several well shutdowns were avoided due to measurement failure of pressure instruments that do not have pre-alarm.

EXAMPLE 4

Real-time tracking of the daily accumulation of produced oil, injected gas, injected water, exported gas, and burned gas, as well as the daily closing forecast, as illustrated in FIGS. 2.1 and 2.2.

EXAMPLE 5

Assistance in commissioning and start-up of producer and injector wells with real-time information on pressurization and depressurization rates of subsea lines and pressure difference for handling valves in the Christmas tree (ANM), as illustrated in FIGS. 2.1 and 2.2.

EXAMPLE 6

Low occurrence of shutdown level 2 (production shutdown due to uncontrolled process). Only two records in the last six months of 2018, during which time the unit operated most of the time with its maximum oil processing capacity.

EXAMPLE 7

Constant visualization of inhibitions on important instruments and control loops that are in manual, as illustrated in FIGS. 2.1 and 2.2.

EXAMPLE 8

Visualization of gas and fire sensors, which are failing and participating in voting for shutdown level 3 (partial), as illustrated in FIGS. 2.1 and 2.2.

It should be noted that, although the present invention has been described with respect to the accompanying drawings, the same is capable of modifications and adaptations by those skilled in the art, depending on the specific situation, but provided that within the inventive scope defined herein.

The invention claimed is:

1. A SUPERVISORY SYSTEM FOR MONITORING VARIABLES OF A PROCESS PLANT, characterized by comprising an interaction of an industrial automation configuration software with a spreadsheet program, where data is acquired instantly in the spreadsheet program from the industrial automation configuration software, and the acquired data is displayed on only two visualization screens within a same window, wherein the system interacts with the spreadsheet program and the industrial automation configuration software for obtaining data instantaneously as follows: with the industrial automation configuration software and the spreadsheet program open, to establish a connection, insert a code into a cell of the spreadsheet program for returning only a value of the monitored variable that is linked to a server, the code corresponds to a name of an executable in the industrial automation configuration software, a name of a tag library in the industrial automation configuration software, a registered name in the industrial automation configuration software to access the server, and a name of a tag registered in the industrial automation configuration software, and additionally, a color change of one of parameters of the acquired data draws the attention of an operator, who has time to take an action before there is an occurrence or automatic actuation of an interlocking and control system.

2. THE SUPERVISORY SYSTEM FOR MONITORING VARIABLES OF A PROCESS PLANT of claim 1, wherein the spreadsheet program uses a DDE protocol to receive the data from the industrial automation configuration software.

3. THE SUPERVISORY SYSTEM FOR MONITORING VARIABLES OF A PROCESS PLANT of claim 1, wherein visualization of the process variables occurs through two spreadsheets of the spreadsheet program.

4. USE OF THE SUPERVISORY SYSTEM as defined in claim 1 for monitoring variables of control rooms of offshore production platforms, or onshore plants.

5. USE OF THE SUPERVISORY SYSTEM as defined in claim 2 for monitoring variables of control rooms of offshore production platforms, or onshore plants.

6. USE OF THE SUPERVISORY SYSTEM as defined in claim 3 for monitoring variables of control rooms of offshore production platforms, or onshore plants.

* * * * *